(12) United States Patent
Draper et al.

(10) Patent No.: US 8,794,083 B2
(45) Date of Patent: Aug. 5, 2014

(54) LOW ROW STEAM GENERATOR INSPECTION PROBE

(75) Inventors: Jeffrey Bishop Draper, McVeytown, PA (US); Matthew Barton Wolf, Boalsburg, PA (US); Michael Alphonse Terhaar, Lewistown, PA (US); Lance Edmund Maggy, Mount Pleasant, SC (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 13/031,905

(22) Filed: Feb. 22, 2011

(65) Prior Publication Data

US 2012/0006134 A1 Jan. 12, 2012

Related U.S. Application Data

(60) Provisional application No. 61/363,554, filed on Jul. 12, 2010.

(51) Int. Cl.
| | |
|---|---|
| *F16L 55/30* | (2006.01) |
| *G01D 11/00* | (2006.01) |
| *G21C 17/017* | (2006.01) |
| *F22B 37/00* | (2006.01) |
| *F16L 101/30* | (2006.01) |

(52) U.S. Cl.
CPC ............ *F22B 37/003* (2013.01); *F22B 37/005* (2013.01); *G01D 11/00* (2013.01); *G21C 17/017* (2013.01); *F16L 55/30* (2013.01); *F16L 2101/30* (2013.01)
USPC ...... 73/866.5; 73/865.8; 104/138.2; 324/220; 376/249

(58) Field of Classification Search
CPC .... F16L 55/30; F16L 2101/30; F22B 37/003; F22B 37/005; G01D 11/00; G21C 17/017

USPC ............ 73/865.8, 866.5; 104/138.2; 137/559; 324/220; 376/249; 976/DIG. 214
See application file for complete search history.

(56) References Cited

U.S. PATENT DOCUMENTS

| | | | |
|---|---|---|---|
| 4,413,231 A | 11/1983 | Amedro et al. | |
| 4,438,399 A * | 3/1984 | Schnabl et al. | ............... 324/220 |

(Continued)

FOREIGN PATENT DOCUMENTS

| | | |
|---|---|---|
| EP | 0023163 A1 | 1/1981 |
| EP | 0244283 A1 | 11/1987 |

(Continued)

OTHER PUBLICATIONS

International Preliminary Report on Patentability PCT/US2012/025616, report issued Aug. 27, 2013.*

(Continued)

*Primary Examiner* — Thomas P Noland
(74) *Attorney, Agent, or Firm* — Cooper Legal Group, LLC

(57) ABSTRACT

An inspection assembly for inspecting a hollow member, with a probe head, which includes at least one sensor, and a flexible shaft connected to the probe head to transmit motive force. The shaft encloses at least one wire operatively connected to the probe head for sensory operation of the sensor. The shaft has a first part adjacent to the probe head and a second part distal therefrom. The first part is relatively more flexible that the second part. The shaft has an improved ability to follow a torturous path of the hollow member and for aiding in kink prevention of the shaft. In one aspect, the first part is made of polymer material and has a reduced-diameter and corrugations. Optionally, at least one non-metallic retrieval cable is enclosed within the shaft and connected to the probe head for transmitting a pulling force to the probe head.

15 Claims, 4 Drawing Sheets

(56) References Cited

U.S. PATENT DOCUMENTS

| | | | |
|---|---|---|---|
| 4,476,368 A | 10/1984 | Cammann et al. | |
| 4,757,258 A | 7/1988 | Kelly, Jr. et al. | |
| 4,821,943 A | 4/1989 | Gaudin et al. | |
| 4,901,578 A | 2/1990 | Brill, III | |
| 4,918,808 A * | 4/1990 | Cartry et al. | F22B 37/003 |
| 5,025,215 A | 6/1991 | Pirl | |
| 5,028,381 A | 7/1991 | Dugue | |
| 5,174,164 A * | 12/1992 | Wilheim | 73/866.5 |
| 5,204,622 A | 4/1993 | McCaslin et al. | |
| 5,256,966 A | 10/1993 | Edwards | |
| 5,279,168 A | 1/1994 | Timm | |
| 5,398,560 A * | 3/1995 | Zollingger et al. | 73/865.8 |
| 5,398,689 A * | 3/1995 | Connor et al. | 600/459 |
| 5,623,204 A | 4/1997 | Wilkerson | |
| 5,657,245 A | 8/1997 | Hecht et al. | |
| 5,883,512 A | 3/1999 | Streit et al. | |
| 6,076,407 A | 6/2000 | Levesque et al. | |
| 6,585,641 B1 * | 7/2003 | Jordfald | 600/144 |
| 6,677,748 B2 | 1/2004 | Hur et al. | |
| 6,959,267 B2 | 10/2005 | Le | |
| 7,109,704 B1 | 9/2006 | Loud | |
| 7,242,201 B2 | 7/2007 | Lee et al. | |
| 7,505,859 B2 | 3/2009 | Lepage et al. | |
| 7,654,122 B2 | 2/2010 | Tsuyugunchi et al. | |
| 7,694,564 B2 | 4/2010 | Brignac et al. | |
| 8,395,108 B2 * | 3/2013 | Mori et al. | 250/227.28 |
| 8,581,577 B2 * | 11/2013 | Draper et al. | 324/220 |
| 2003/0065261 A1 * | 4/2003 | Itoi | 600/437 |
| 2004/0075432 A1 | 4/2004 | Loud | |
| 2008/0278157 A1 | 11/2008 | Zimmerman | |
| 2009/0243605 A1 | 10/2009 | Bouregelas et al. | |
| 2011/0089937 A1 | 4/2011 | Petrosky | |
| 2013/0009634 A1 | 1/2013 | Lakhan et al. | |

FOREIGN PATENT DOCUMENTS

| | | | |
|---|---|---|---|
| EP | 0298841 A1 | 1/1989 | |
| EP | 0354090 A2 | 2/1990 | |
| FR | 2928024 A1 | 8/2009 | |
| JP | S56142456 A | 11/1981 | |
| WO | 9313413 A1 | 7/1993 | |
| WO | 2010148487 A1 | 12/2010 | |
| WO | WO 2012115871 A2 * | 8/2012 | G01D 15/00 |
| WO | WO 2013025247 A2 * | 2/2013 | G01D 15/00 |

OTHER PUBLICATIONS

International Preliminary Report on Patentability PCT/US2012/025618, report issued Aug. 27, 2013.*

Search Report and Written Opinion from WO Application No. PCT/US2012/025618 International Search completed Apr. 16, 2013.

Search Report and Written Opinion from WO Application No. PCT/US2012/025616 International Search completed Apr. 18, 2013.

PCT Search Report and Written Opinion dated Jan. 30, 2014, issued in connection with corresponding WO Application No. PCT/US2012/025602.

* cited by examiner

US 8,794,083 B2

LOW ROW STEAM GENERATOR INSPECTION PROBE

CROSS REFERENCE TO RELATED APPLICATION

The present application is a continuation of U.S. Provisional Patent Application No. 61/363,554, filed Jul. 12, 2010, which is incorporated herein by reference.

BACKGROUND OF THE INVENTION

1. Field of Invention

The present invention relates to internal inspection probes for inspecting hollow members, such as a hollow member present within nuclear steam generator.

2. Discussion of Prior Art

Use of inspection/detection devices, such as eddy current sensors, is known. Such devices can be used, for example, for nuclear generator hollow tubular members with tortuous bends (e.g., u-bends). However, it is possible for known devices to become lodged, or otherwise not able to proceed along the hollow member such that further inspection is not possible. Thus there is a need for improvements to avoid such issues.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides an inspection assembly for insertion inspection of an elongate hollow member. The inspection assembly includes a probe head that includes at least one sensor for sensing a characteristic of the elongate hollow member as the probe head is moved internally within the elongate hollow member. The inspection assembly also includes a flexible shaft connected to the probe head and which transmits a motive force to the probe head to move the probe head within the elongate hollow member. The flexible shaft encloses at least one wire operatively connected between the probe head and at least one component external to the elongate hollow member for sensory operation of the sensor. The flexible shaft has a first part adjacent to the probe head and a second part distal from the probe head. The first part of the flexible shaft is relatively more flexible that the second part of the flexible shaft.

In accordance with another aspect, the present invention provides an inspection assembly for insertion inspection of an elongate hollow member. The inspection assembly includes a probe head that includes at least one sensor for sensing a characteristic of the elongate hollow member as the probe head is moved internally within the elongate hollow member. The inspection assembly also includes a flexible shaft connected to the probe head and which transmits a motive force to the probe head to move the probe head within the elongate hollow member. The flexible shaft encloses at least one wire operatively connected between the probe head and at least one component external to the elongate hollow member for sensory operation of the sensor. The flexible shaft has means for improving an ability to follow a torturous path of the elongate hollow member and for aiding in kink prevention of the flexible shaft.

In accordance with still another aspect, the present invention provides an inspection assembly for insertion inspection of an elongate hollow member. The inspection assembly includes a probe head including at least one sensor for sensing a characteristic of the elongate hollow member as the probe head is moved internally within the elongate hollow member. The inspection assembly also includes a flexible shaft connected to the probe head and which transmits a motive force to the probe head to move the probe head within the elongate hollow member. The flexible shaft encloses at least one wire operatively connected between the probe head and at least one component external to the elongate hollow member for sensory operation of the sensor. The flexible shaft has at least one part made of polymer material and having a reduced-diameter and corrugations.

In accordance with still another aspect, the present invention provides an inspection assembly for insertion inspection of an elongate hollow member. The inspection assembly includes a probe head including at least one sensor for sensing a characteristic of the elongate hollow member as the probe head is moved internally within the elongate hollow member. The inspection assembly includes a flexible shaft connected to the probe head and which transmits a motive force to the probe head to move the probe head within the elongate hollow member. The inspection assembly includes at least one wire enclosed within the flexible shaft and operatively connected between the probe head and at least one component external to the elongate hollow member for sensory operation of the sensor. The inspection assembly also includes at least one non-metallic retrieval cable enclosed within the flexible shaft connected to the probe head for transmitting a pulling force to the probe head upon needed retrieval of the probe head from the elongate hollow member.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
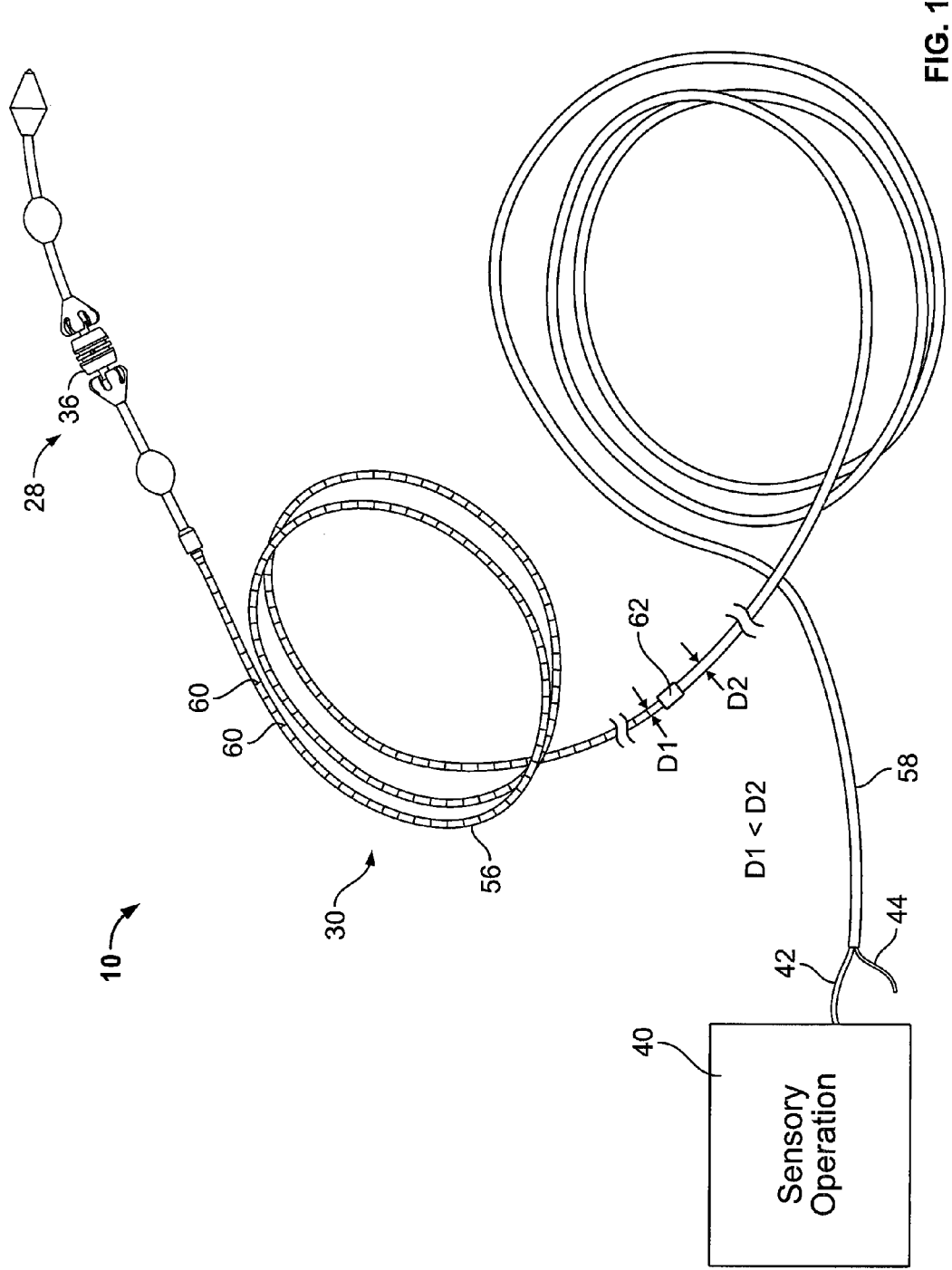
FIG. 1 is a schematized illustration of an example inspection assembly in accordance with at least one an aspect of the present invention.

Illustrative embodiments that incorporate one or more aspects of the invention are described and illustrated in the drawings. These illustrated examples are not intended to be overall limitations on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example of an inspection assembly 10 in accordance with aspects of the present invention is schematically shown in FIG. 1. It is to be appreciated that the example is for illustrative purposes only and need not present specific limitations upon the scope of the present invention. The inspection assembly 10 is for insertion inspection of an elongate hollow tubular member 12 (see for example, a tubular member shown within FIG. 2). Hereinafter the tubular member 12 is presented as part of the presented example. However, it is to be appreciated that other, different hollow members are envisioned. Thus, the tubular member 12 is just one example of a hollow member.

Figure 2:
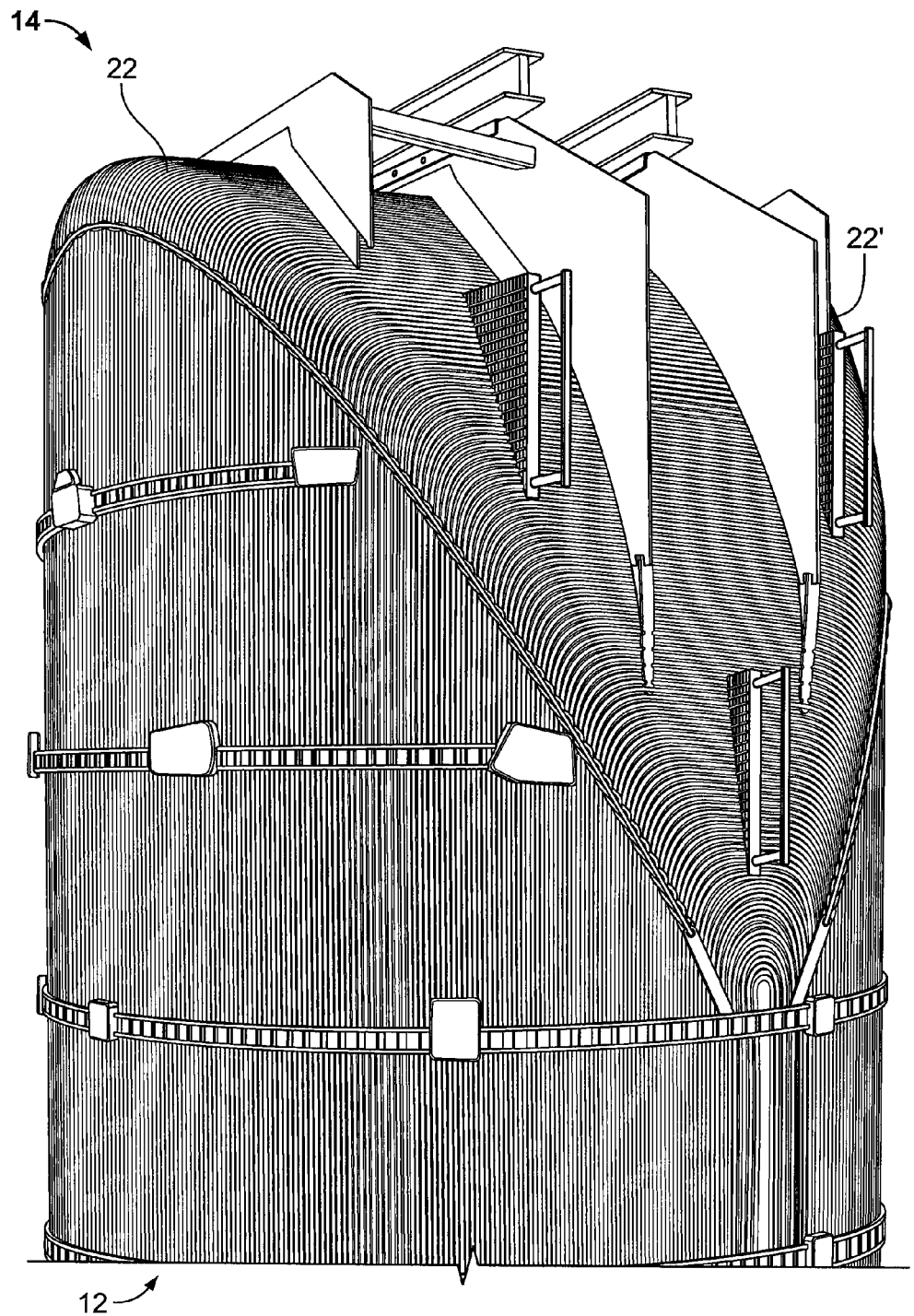
FIG. 2 is an illustration of an example of a nuclear steam generator having a plurality of hollow members that have at least one bend and within which the present invention may be utilized.

Turing briefly to FIG. 2 and the tubular member 12 shown therein, the device shown in FIG. 2 is an example generator 14 within which the inspection assembly 10 of FIG. 1 may be utilized. The tubular member 12 may be part of a "Low Row" (2.0" radius tube and greater) U-bend tube of the generator 14. The example generator 14 shown within FIG. 2 merely presents one example environment for the inspection assembly 10. It is to be appreciated that the present invention can be used in other environments (e.g., other tubular environments associated with different generators and other tubular environments that are not part of a generator). The generator 14 and numerous tubular members 12 (only one example tubular member 12 is identified with a reference number, however, any of the shown tubular members could be so identified).

Figure 3:
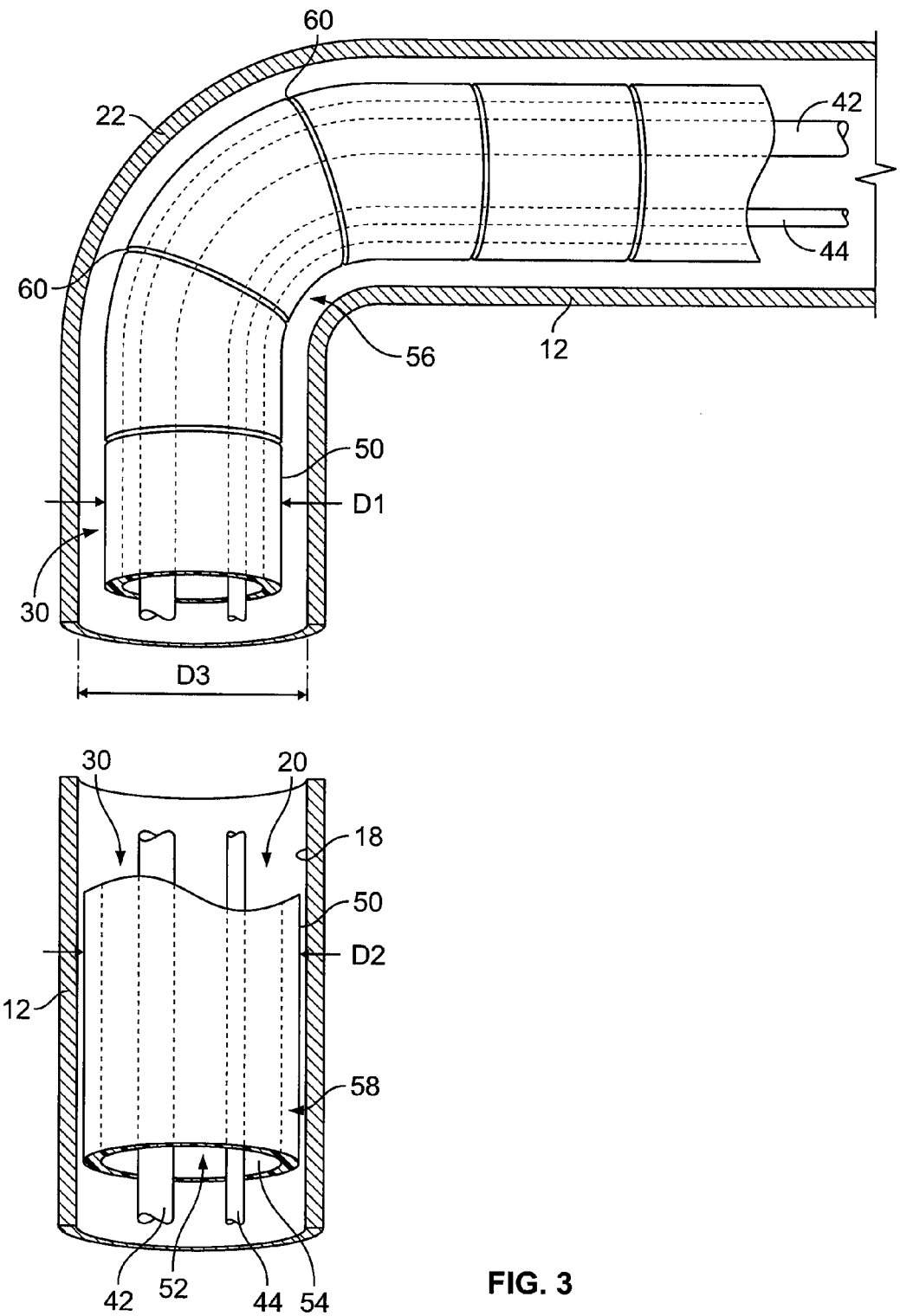
FIG. 3 is an illustration of torn-away portions of an example probe shaft of the assembly of FIG. 1 that are within example torn-open portions of a hollow member of the generator of FIG. 2 and in accordance with at least one aspect of the present invention.

Focusing upon the tubular member 12, the tubular member is hollow and has a generally arcuate/rounded (e.g., circular or oval cross-section) interior surface 18 (see the example section of FIG. 3). The interior surface 18 of the tubular member 12 bounds an interior space 20 of the tubular member 12. In some specific examples the tubular member 12 is relatively long and has at least one bend 22 (the example bend shown in FIG. 1 is a transition between vertical and horizontal sections of the tubular member). In further specific examples, the tubular member 12 has multiple bends (e.g., 22' shown within FIG. 2) and thus provides a tortuous path along its interior space 20. In at least one example, two bends 22, 22' within the tubular member 12 provides the member with a U-bend configuration. The tubular member 12 can have a varied length. The at least one bend 22 and/or the length of the tubular member 12 can provide for a path within the tubular member that can be considered to be tortuous.

Focusing again upon the inspection assembly 10 (FIG. 1), the assembly is for inspection of the tubular member 12 (FIGS. 2 and 3) from the perspective of the interior space 20 of the tubular member 12. Such inspection may be in the form of sensing/testing/monitoring at least one condition of the tubular member 12 from the interior space 20 of the tubular member along the tubular member. The at least one condition need not be a specific limitation upon the present invention. The inspection assembly 10 (FIG. 1) includes a probe head 28 and a flexible probe shaft 30, with the probe head 28 connected to the probe shaft 30.

At least one sensor 36 (shown generically in FIG. 1) that senses/tests/monitors the at least one characteristic (e.g., a condition) of the tubular member 12 is located within/at the probe head 28. The type/specifics of the sensor(s) 36 within the probe head 28, and the probe head 28 itself, need not be specific limitations upon the present invention. An example of characteristic (e.g., a condition) to be sensed/tested/monitored includes structural integrity (e.g., weakened portions) of the tubular member 12. In one example, the sensor(s) 36 include an eddy current sensor that includes wire windings within a bobbin and an adjacent magnet. It is to be appreciated that the probe head 28 may include a variety of structures, components, features, and the like that need not be part of the present invention. The other components may or may not be spaced apart upon a flexible segment. As such, the probe head 28 shown within FIG. 1 is merely an example.

The probe head 28 is operatively connected to a sensory operation portion 40 (schematically represented as simply a box) of the inspection assembly 10 via at least one wire 42. To be clear, the wire(s) 42 may be a plurality of wires or provided a wiring bundle and referred to as a simply a wire. Different wires within the plurality or bundle could accomplish different functions. The wire(s) 42 extends to be operatively connected to the probe head 28, extends along the length of the probe shaft 30, and extends to be operatively connected to the sensory operation portion 40. The wire(s) 42 are housed within an interior of the probe shaft 30 as described further following. Electrical power and/or electrical signals (e.g., control and/or sensory) are passed along the wire(s) 42 between the probe head 28 and the sensory operation portion 40.

In general, the probe head 28 of the inspection assembly 10 is moved along the interior space 20 of the tubular member 12 while the probe head 28 senses/tests/monitors. The sensory operation portion 40, via the wire connection to the probe head 28, provides power and/or control and receives sensory signals from the probe head 28 to make determination(s) about the sensed/tested/monitored at least one condition of the tubular member 12 as the probe head 28 is moved relatively along the tubular member. In is to be appreciated that the sensory operation portion 40 may contain any suitable structures to perform the functions, such as power source components, processing components (e.g., one or more microprocessors), data storage components, and communication components. The sensory operation portion 40 may be operatively connected to one or more external or intermediary components (not shown) for control of the sensory operation portion 40 and/or provision of the sensory information outside of the shown system and/or other operations.

As mentioned, the probe head 28, with its sensor(s) 36, is moved along the tubular member 12. The movement along the tubular member 12 is first inbound (e.g., inserting) relative to the tubular member 12 and is secondly outbound (e.g., extracting) relative to the tubular shaft. The motive force to move the probe head 28 along tubular member 12 is imparted via force applied to the probe shaft 30. In one example, the motive force is in the form of manual force applied to the probe shaft 30.

As mentioned, the probe shaft 30 houses the wire(s) 42 extending between the probe head 28 and the sensory operation portion 40. It is possible to consider the wire(s) 42 to be part of the probe shaft 30. Also, within the shown example, an optional non-metal cable 44 is provided as part of the probe shaft 30, and the cable is coupled to the probe head 28. The cable 44 is housed within the interior of the probe shaft 30 and can be considered to be part of the probe shaft. The cable 44 provides for the transmission of tensile force for extracting (i.e., pulling to retrieve) the probe head 28 from the tubular member 12. The cable 44 may be braided filament cordage. The use of non-metal material for the cable 44 helps to avoid imposing electrical interference to the wire(s) 42. Of course, a different construction/material may be used for the cable 44.

Focusing upon the probe shaft 30, the shaft includes a surrounding, hollow sheath tubing 50 that houses the wire(s) 42 and the optional cable 44 within an interior space 52 of the sheath tubing 50. The interior space 52 of the sheath tubing 50 is bounded by an interior surface (or surface segments) 54 of the sheath tubing 50. The cross-sectional area of the interior space 52 may be any suitable cross-section dimension for acceptance of the wire(s) 42 and optional cable 44 therein. It is possible that the cross-sectional size of the interior space 52 may vary along its length. It is to be noted FIG. 3 shows the wire(s) 42 and the cable 44 filing only part of the volume of the sheath tubing. Such is only an example and permits ease of viewing the different components, and should not be taken as a required limitation upon the present invention.

The overall length of the probe shaft 30, and specifically the sheath tubing 50, may be any suitable length. However, within one example the length is sufficiently long to meet or exceed a length measured along the entire elongate extent of the tubular member 12. For such an example, the probe head 28 may be moved along the entire elongate extent of the tubular member via insertion movement of the probe shaft 30 into the tubular member 12. Recall that it is force applied to the sheath tubing 50 of the probe shaft 30 that moves the probe head 28 along the insertion direction of the tubular member. With regard to length of the wire(s) 42, the length is of course at least a great as the sheath tubing 50, but also sufficiently long to be operatively connected to the sensory operation portion 40. With regard to length of the cable 44, the length is of course at least a great as the sheath tubing 50, but also sufficiently long to be engaged (e.g., grasped) for application of tensile (i.e., pulling) force for extracting to retrieve the probe shaft 30 and probe head 28.

The probe shaft 30, with the included wire(s) 42 and cable 44, is flexible. The flexibility allows the probe shaft 30 to proceed along bends (e.g., 22, 22') of the tubular member 12. Yet the probe shaft 30 has sufficient rigidity to allow insertion into the tubular member 12 and move the probe head 28 along the extent of the tubular member 12.

In accordance with one aspect, probe shaft 30 includes at least one feature or means for improving ease of moving the probe shaft 30 and the probe head 28 of the inspection assembly 10 along the tubular member 12. Such at least one feature or means may include reducing friction that otherwise may occur between the probe shaft 30 and the tubular member 12 and/or negotiating the torturous path of the tubular member 12. In one aspect or means, the sheath tubing 50 of the probe shaft 30 (See FIGS. 1, 3 and 4), is provided with two parts 56, 58 (first and second parts) that have at least one dissimilarity to provide a feature for improving ease of moving. In one feature aspect or means, the first part 56 has an outer diameter D1 less than the outer diameter D2 of the second part 58. Thus the at least one dissimilarity is a difference in diameter. In another feature aspect or means, the first part 56 has at least one structural feature that differs from a corresponding structural feature of the second part 58. Thus, the at least one dissimilarity is a difference in the structural feature. Within one specific example, the first part 56 has corrugations 60, as a structural feature, whereas the second part 58 has an absence of corrugation. Within yet another feature aspect or means, the first part 56 is made of a first material and the second part 58 is made of a second material, which is different from the first material. It is to be appreciated that the probe shaft 30 may have one or more than one feature aspect or means for improving the ease of movement. In yet another feature or means, the first part 56 of the flexible shaft 30 is relatively more flexible that the second part 58. In yet another feature or means, the flexible shaft has means for improving an ability to follow a torturous path of the elongate tubular member and for aiding in kink prevention of the flexible shaft.

Within the shown example, the probe shaft 30 is a composite shaft, with its two parts 56, 58 being provided by joining two shaft segments together with a coupling 62. However, it is to be appreciated that it is possible to prepare/define the two parts 56, 58 via a different approach (e.g., process and/or provide treatment to one part different than the other part). Within the shown example the coupling 62 (see FIGS. 1 and 4) joins the two parts 56, 58. It is to be appreciated that the coupling 62 is only schematically shown and thus may have a variety of constructions/configurations. However, it is to be further appreciated that the coupling 62 has a hollow bore to permit passage of the wire(s) 42 and optional cable 44. Also, the coupling 62 is secured to the two segments via any suitable connection means 64, such as adhesive, friction engagement, crimping members or the like.

Figure 4:
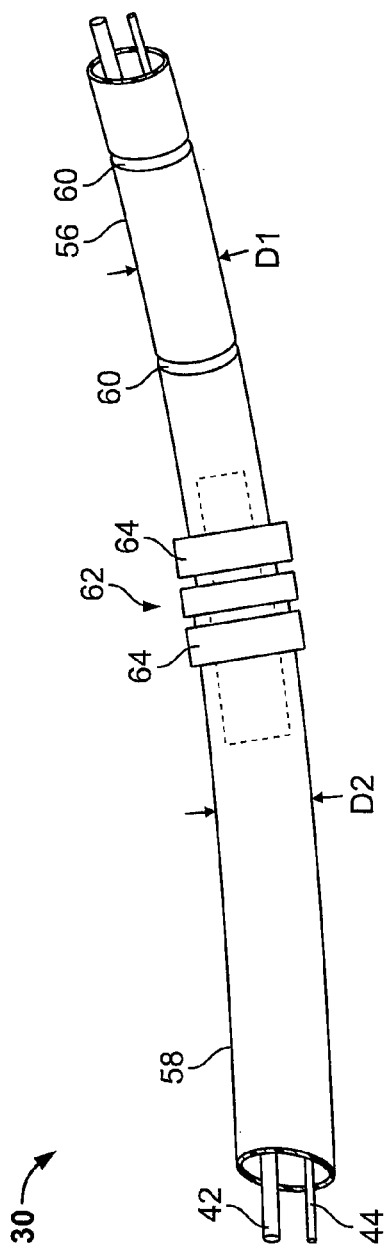
FIG. 4 is an illustration of a portion of the probe shaft of the assembly of FIG. 1 and shows first and second sections coupled together, showing different diameters of the first and second sections in accordance with an aspect of the present invention and showing corrugations on the first section in accordance with an aspect of the present invention.

Turing briefly to the shown example of FIG. 4, the coupling 62 includes portions that extend into the interior spaces of each of the two parts 56, 58. The portions may have barbs or other structural features to aid in retaining engagement with the two parts 56, 58. The shown connection means 64 includes two crimping members that encircle the ends of the first and second parts 56, 58 and are crimped onto the ends to constrain the ends onto the portions of the coupling 62 that are within the ends. The outer dimension of the coupling is sufficiently small so as to avoid undue interference with the tubular member 12 and the movement of the probe shaft 30 there through. Of course, the shown example may be varied.

It is to be appreciated that the lengths of the first and second parts 56, 58 can be varied. This length variation is represented by the tear lines shown within FIG. 1. The length of the first and/or second parts 56, 58 may be selected based upon a relationship to the tubular member 12. For example, relationship(s) may be based upon overall length of the tubular member 12, number/type of bends 22 within the tubular member, or other characteristics of the tubular member. Also, it is contemplated that the comparative lengths of the first and second parts 56, 58 may be varied/selected. In one example, the first part 56 has a length shorter than the second part 58. In one specific example, the length of the first part 56 is much shorter than the length of the second part 58. In one such example, the first part 56 has a length of approximately 4-20 feet and the second part 58 has a length of approximately 80 feet, but of course the overall length of the probe shaft 30 may be related to a specific application.

Focusing upon the aspect of the first and second parts 56, 58 of the probe shaft 30 having different diameters, within the shown example the diameter D1 of the first part 56 is less than D2 of the second part 58. The first part 56, with the smaller diameter D1, is attached to the probe head 28 and the second part, with the larger diameter D2, is located distal from the probe head.

The actual values of D1 and D2, and the difference between D1 and D2 (Delta D1-D2) can be varied. It is contemplated that the values D1 and D2, and the Delta D1-D2, can be selected to have a relationship to the interior diameter D3 of the tubular member 12. It is also contemplated that the values D1 and D2, and the Delta D1-D2, can be selected to have a relationship to the length of the tubular member 12, type bends of the tubular member, or even other factors of the tubular member.

The larger diameter, second part 58 can provide an improved ability concerning the mechanical pushing of the probe shaft 30 through the tubular member 12. For example, the present inventors have recognized that a shaft that has a relatively small diameter as compared to the interior diameter D3 of the tubular member may develop an added resistance as the probe shaft travels through the tubular member due to the smaller diameter shaft having a greater ability/tendency to kink. If such a shaft becomes kinked and cannot proceed further along the tubular member, a probe sensor attached to such a probe shaft can become useless. In distinction and in accordance with an aspect of the present invention, the larger diameter, second part 58 of the probe shaft 30 can provide for some increased stiffness as compared to the first part 56 of the probe shaft. Also, the larger diameter, second part 58 of the probe shaft 30 can have an increased resistance to kinking within the interior space 20 of the tubular member 12. In at least one respect this increased resistance may be provided because the larger diameter, second part inherently fills more of the interior space 20 of the tubular member 12. Thus, one aspect of the invention is to providing a larger and/or stiffer probe shaft part 58 onto the back-end of a shorter, smaller shaft part 56 so that the overall probe shaft 30 is more resistant to kinking. Such a feature can increase the ability to push the probe shaft 30, and the probe head 28 attached thereto, through the tubular member 12.

Turning to FIG. 3, an example showing the two different diameters D1, D2 is provided. Within the shown example, the diameter D1 of the first part 56 is noticeably smaller than a dimension D3 of the interior surface 18 of the tubular member 12. This diameter difference can allow the first part 56 to more readily flex as the bend 22 in the tubular member 12 is encountered. In addition, the smaller diameter D1 may provide for a reduction in friction at the first part 56. It should be appreciated that FIG. 3 merely shows an example, and thus the relative dimensions and flexing shown therein are merely illustrative.

Also, within the shown example, the diameter D2 of the second part 58 is only somewhat smaller than the diameter D3 of the interior surface 18 of the tubular member 12. Of course, the diameter D2 is smaller that the diameter D3, but nonetheless, a closeness of values of D2 and D3 helps prevent kinking of the second part 58. This may provide a useful benefit if long sections of the second part 58 are employed within the tubular member 12.

Again referring to FIG. 3, an example of the corrugations 60 on one part, but not the other part is shown. Specifically, the first part 56 is corrugated (i.e., has corrugations 60). Corrugation can be any series of localized deformations, crimpings, undulations, flexing/elongation points, or the like. In one example, the corrugation can be implemented by crimping to plastically deform the tubing at a series of locations along its length. It is contemplated that the corrugations 60 lower the contact area between the probe shaft 30 (e.g., at the first part 56) and the tubular member 12, which reduces friction. It is also contemplated that the corrugations 60 also appears to help make the probe shaft 30 (e.g., at the first part 56) more flexible, thus helping it traverse a bend 22 more easily. It is to be noted that the shown example has the corrugations 60 on the first part 56 and not the second part 58. It should be noted that the corrugations 60 need not be over the entire length of the first part 56. As another possibility, the corrugations 60 may be at varied intervals. In one example, a greater number of corrugations 60 (i.e., shorter spacing interval between adjacent corrugations) is provided near the probe head 28. This variation in the corrugations 60 may provide one or more benefits such as increased flexibility.

Concerning material(s) for the probe shaft 30, various materials are possible. In one example, a polymer-based material is utilized. However, other materials (e.g., various plastics) can be used. The first part 56 of the flexible shaft 30 can have a different material characteristic from the second part 58 of the flexible shaft 30. For example, the first part 56 of the flexible shaft 30 is made of a polymer material different from the material of the second 58 part of the flexible shaft 30. With regard to the first part 56, the material can be more flexible than the material of the second part 58. Accordingly, the material of the second part 58 would be more rigid or stiff than the material of the first part 56. Also, the material of the first part 56 could be selected so as to be plastic deformable during formation of the corrugations 60. One example material is Nylon tubing that is commercially available from S&L Plastics. A tubing size of 7 mm outer diameter (OD) and 5 mm inner diameter (ID), can be used.

In general, the probe shaft 30 with its stiffer, larger diameter second part 58 coupled with the shorter, more flexible and smaller diameter first part 56 is more resistant to kinking, which increases the ability to push the probe through the bends 22. As can be appreciated, bends within and/or an increased length of the tubular member 12 (i.e., its tortuous path) act as impediments to movement of the probe head 28 of the inspection assembly 10 along the tubular member 12. Also, even if the tubular member 12 has possible access openings from multiple (e.g., two) locations, such as two ends, it may be sometimes advantageous to move the probe head 28 of the inspection assembly 10 through the entire length of the tubular member from only a single access opening.

Figure 5:
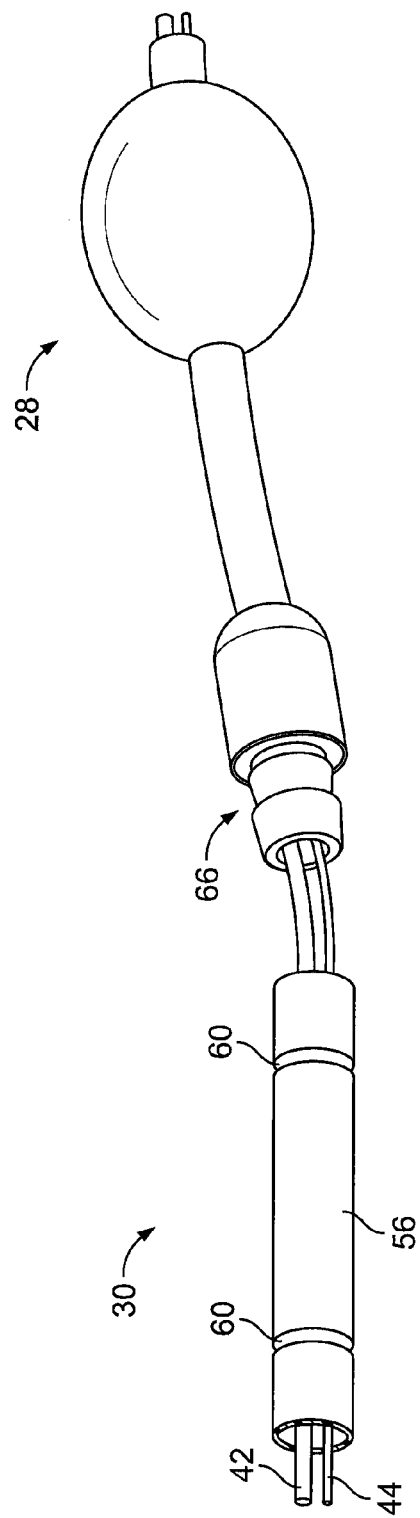
FIG. 5 is an illustration of the first portion of the shaft connected to a sensor head of the assembly in accordance with one aspect of the present invention, but with an outer sheathing tubing partially removed to show internal structures and connections.

As mentioned, the probe shaft can have an optional cable 44 and the cable 44 is attached via suitable means to the probe head 28. In one example, the probe shaft 30, and its cable 44, is connected to the probe head via a junction fitting 66 (See FIG. 5 in which part of the sheath tubing 50 at the first part 56 is torn away at the junction fitting 66 to shown more of the junction fitting). In one example, the junction fitting is a stainless steel ferrule. In one embodiment, the junction fitting 66 between the probe head 28 and the probe shaft 30 has also been minimized in diameter to allow the probe to more easily enter the U-Bend area. Secured with adhesive and the junction fitting 66 has barbs on the end that bite into the polymer material and hold it in place. It is also possible to include a feature to keep the probe head 28 from rotating relative to the probe shaft 30. In one example, two half-moon shapes provided into the end of the first part 56 of the probe shaft 30 helps prevent rotation when bonded in place. The epoxy can fill the half moons and bonds to the junction fitting 66 locking the tubing in place.

One or more of the above the difference(s) (e.g., difference in diameters, difference of materials, difference in corrugation) between the two parts 56, 58 of the flexible shaft 30 thus can provide that the first part 56 of the flexible shaft 30 being relatively more flexible that the second part 58 of the flexible shaft 30 and thus also provide means for improving an ability to follow a torturous path of the elongate tubular member 12 and for aiding in kink prevention of the flexible shaft 30.

One problem that is solved is the need for the utilities to open up both ends of a steam generator to do a low row tubing examination. Current technology requires one half of the tubing to be inspected from one end of the generator, and the other half to be inspected from the other end. This exposes the operators to a longer dose of radiation and takes more setup and test time. By developing a probe that allows for inspection from one side, the utilities will save time, money and radiation exposure.

One technical advantage is the ability for the probe to successfully traverse a small radius tube to do a low row tubing inspection from one side of the generator. Current steam generator probes are not flexible enough and have too much friction between them and the steam generator tubing to do this. Commercially, this is an advantage over existing technology because it will allow the utilities to recognize a significant cost and time savings when doing steam generator inspections.

The present invention provides a useful inspection assembly for a "Low Row" (2.0" radius tube and greater) U-bend tube of the generator while being durable enough to last for the inspection of approximately 1000 U-Bend tubes.

In recap, the present invention provides several aspects. One example aspect is an inspection assembly 10 for insertion inspection of an elongate tubular member 12. The inspection assembly 10 includes a probe head 28 that includes at least one sensor 36 for sensing a characteristic of the elongate tubular member 12 as the probe head 28 is moved internally within the elongate tubular member 12. The inspection assembly 10 also includes a flexible shaft 30 connected to the probe head 28 and which transmits a motive force to the probe head 28 to move the probe head 28 within the elongate tubular member 12. The flexible shaft 30 encloses at least one wire 42 operatively connected between the probe head 28 and at least one component 40 external to the elongate tubular member 12 for sensory operation of the sensor 36. The flexible shaft 30 has a first part 56 adjacent to the probe head 36 and a second part 58 distal from the probe head 36. The first part 56 of the flexible shaft 30 is relatively more flexible that the second part 58 of the flexible shaft 30. The first and second parts 56, 58 of the flexible shaft 30 may be made of polymer material, with the first part 56 of the flexible shaft 30 having a different characteristic from the second part 58 of the flexible shaft 30. The first part 56 of the flexible shaft 30 may have an outer diameter D1 smaller than an outer diameter D2 of the second part 30 of the flexible shaft 30. The first part 56 of the flexible shaft 30 may be made of a polymer material different from the material of the second 58 part of the flexible shaft 30. The first part 56 of the flexible shaft 30 may be at least partially corrugated 60 and the second part 58 of the flexible shaft 30 is at least partially non-corrugated. The first part 56 of the flexible shaft 30 may be connected to the second part 58 of the flexible shaft 30 via a coupling 62. The inspection assembly 10 may further include at least one non-metallic retrieval cable 44 enclosed within the flexible shaft 30 connected to the probe head 28 for transmitting a pulling force to the probe head 28 upon needed retrieval of the probe head 28 from the elongate tubular member 12.

Another example aspect is an inspection assembly 10 for insertion inspection of an elongate tubular member 12. The inspection assembly 10 includes a probe head 28 that includes at least one sensor 36 for sensing a characteristic of the elongate tubular member 12 as the probe head 28 is moved internally within the elongate tubular member 12. The inspection assembly 10 also includes a flexible shaft 30 connected to the probe head 28 and which transmits a motive force to the probe head 28 to move the probe head 28 within the elongate tubular member 12. The flexible shaft 30 encloses at least one wire 42 operatively connected between the probe head 28 and at least one component 40 external to the elongate tubular member 12 for sensory operation of the sensor 36. The flexible shaft 30 has means (e.g., 56, 58) for improving an ability to follow a torturous path of the elongate tubular member 12 and for aiding in kink prevention of the flexible shaft 30. The means (e.g., 56, 58) for improving an ability to follow a torturous path of the elongate tubular member 12 and for aiding in kink prevention of the flexible shaft 30 can include providing the flexible shaft 30 to have a first part 56 adjacent to the probe head 28 and a second part 58 distal from the probe head 28, with the first part 56 of the flexible shaft 30 being relatively more flexible that the second part 58 of the flexible shaft 30. The first part 56 of the flexible shaft 30 can have an outer diameter D1 smaller than an outer diameter D2 of the second part 58 of the flexible shaft 30. The outer diameter D2 of the second part 58 of the flexible shaft 30 can be sufficiently close to an inner diameter D3 of the elongate tubular member 12 so as to prevent kinking of the second part 58 of the flexible shaft 30. The first part 56 of the flexible shaft 30 can be made of a polymer material different from the material of the second part 58 of the flexible shaft 30. The first part 56 of the flexible shaft 30 can be at least partially corrugated 60 and the second part 58 of the flexible shaft 30 is at least partially non-corrugated. The first part 56 of the flexible shaft 30 can be connected to the second part 58 of the flexible shaft 30 via a coupling 62. The inspection assembly 10 can further include at least one non-metallic retrieval cable 44 enclosed within the flexible shaft 30 connected to the probe head 28 for transmitting a pulling force to the probe head 28 upon needed retrieval of the probe head 28 from the elongate tubular member 12.

Another example aspect is an inspection assembly 10 for insertion inspection of an elongate tubular member 12. The inspection assembly 10 includes a probe head 28 including at least one sensor 36 for sensing a characteristic of the elongate tubular member 12 as the probe head 28 is moved internally within the elongate tubular member 12. The inspection assembly 10 also includes a flexible shaft 30 connected to the probe head 28 and transmitting a motive force to the probe head 28 to move the probe head 28 within the elongate tubular member 12. The flexible shaft 30 encloses at least one wire 42 operatively connected between the probe head 28 and at least one component 40 external to the elongate tubular member 12 for sensory operation of the sensor 36. The flexible shaft 30 has at least one part 56 made of polymer material and having a reduced-diameter D1 and corrugations 60. The flexible shaft 30 may have a second part 58 having a diameter D2 greater than the diameter D1 of the at least one part 56 and not having corrugations.

Another example aspect is an inspection assembly 10 for insertion inspection of an elongate tubular member 12. The inspection assembly 10 includes a probe head 28 including at least one sensor 36 for sensing a characteristic of the elongate tubular member 12 as the probe head 28 is moved internally within the elongate tubular member 12. The inspection assembly 10 includes a flexible shaft 30 connected to the probe head 28 and transmitting a motive force to the probe head 28 to move the probe head 28 within the elongate tubular member 12. The inspection assembly 10 includes at least one wire 42 enclosed within the flexible shaft 30 and operatively connected between the probe head 28 and at least one component 40 external to the elongate tubular member 30 for sensory operation of the sensor 36. The inspection assembly 10 also includes at least one non-metallic retrieval cable 44 enclosed within the flexible shaft 30 connected to the probe head 28 for transmitting a pulling force to the probe head 36 upon needed retrieval of the probe head 28 from the elongate tubular member 12. The flexible shaft 30 may include a first part 56 adjacent to the probe head 28 and a second part 58 distal from the probe head 28, with the first part 56 of the flexible shaft 30 being relatively more flexible that the second part 58 of the flexible shaft 30. The first and second parts 56, 58 of the flexible shaft 30 may be made of polymer material, with the first part 56 of the flexible shaft 30 having a different characteristic from the second part 58 of the flexible shaft 30. The first part 56 of the flexible shaft 30 may have an outer diameter D1 smaller than an outer diameter D2 of the second part 58 of the flexible shaft 30. The first part 56 of the flexible shaft 30 may be made of a polymer material different from the material of the second part 58 of the flexible shaft 30. The first part 56 of the flexible shaft 30 may be at least partially corrugated 60 and the second part 58 of the flexible shaft 30 is at least partially non-corrugated.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed:

1. An inspection assembly for insertion inspection of an elongate hollow member, the inspection assembly including:
   a probe head including any and all sensors for sensing at least one characteristic of the elongate hollow member as the probe head is moved internally within the elongate hollow member, the probe head having an elongation length that encompasses the any and all sensors; and
   a flexible shaft connected to the probe head and transmitting a motive force to an entirety of the probe head to move the probe head within the elongate hollow member, the flexible shaft not containing any sensors, the flexible shaft enclosing at least one wire operatively connected between the probe head and at least one component external to the elongate hollow member for sensory operation of the at least one sensor, and the flexible shaft having a first part adjacent to the probe head and a second part distal from the probe head and coupled to the first part of the flexible shaft, each of the first and second parts of the flexible shaft having elongation lengths that are greater than the elongation length of the probe head, the first part of the flexible shaft being relatively more flexible that the second part of the flexible shaft.

2. An inspection assembly as set forth in claim 1, wherein the first and second parts of the flexible shaft are made of polymer material, with the first part of the flexible shaft having a different characteristic from the second part of the flexible shaft.

3. An inspection assembly as set forth in claim 2, wherein the first part of the flexible shaft has an outer diameter smaller than an outer diameter of the second part of the flexible shaft.

4. An inspection assembly as set forth in claim 2, wherein the first part of the flexible shaft is made of a polymer material different from the material of the second part of the flexible shaft.

5. An inspection assembly as set forth in claim 2, wherein the first part of the flexible shaft is at least partially corrugated and the second part of the flexible shaft is at least partially non-corrugated.

6. An inspection assembly as set forth in claim 1, wherein the first part of the flexible shaft is connected to the second part of the flexible shaft via a coupling.

7. An inspection assembly as set forth in claim 1, further including at least one non-metallic retrieval cable enclosed within the flexible shaft connected to the probe head for transmitting a pulling force to the probe head upon needed retrieval of the probe head from the elongate hollow member.

8. An inspection assembly for insertion inspection of an elongate hollow member, the inspection assembly including:
   a probe head including any and all sensors for sensing at least one characteristic of the elongate hollow member as the probe head is moved internally within the elongate hollow member, the probe head having an elongation length that encompasses the any and all sensors; and
   a flexible shaft connected to the probe head and transmitting a motive force to an entirety of the probe head to move the probe head within the elongate hollow member, the flexible shaft not containing any sensors, the flexible shaft enclosing at least one wire operatively connected between the probe head and at least one component external to the elongate hollow member for sensory operation of the at least one sensor, the flexible shaft having a first part adjacent to the probe head and a second part distal from the probe head and coupled to the first part of the flexible shaft, each of the first and second parts of the flexible shaft having elongation lengths that are greater than the elongation length of the probe head, and the flexible shaft having means for improving an ability to follow a torturous path of the elongate hollow member and for aiding in kink prevention of the flexible shaft.

9. An inspection assembly as set forth in claim 8, wherein the means for improving an ability to follow a torturous path of the elongate hollow member and for aiding in kink prevention of the flexible shaft includes providing the flexible shaft to have a first part adjacent to the probe head and a second part distal from the probe head, with the first part of the flexible shaft being relatively more flexible that the second part of the flexible shaft.

10. An inspection assembly as set forth in claim 9, wherein the first part of the flexible shaft has an outer diameter smaller than an outer diameter of the second part of the flexible shaft.

11. An inspection assembly as set forth in claim 10, wherein the outer diameter of the second part of the flexible shaft being sufficiently close to an inner diameter of the elongate hollow member so as to prevent kinking of the second part of the flexible shaft.

12. An inspection assembly as set forth in claim 9, wherein the first part of the flexible shaft is made of a polymer material different from the material of the second part of the flexible shaft.

13. An inspection assembly as set forth in claim 9, wherein the first part of the flexible shaft is at least partially corrugated and the second part of the flexible shaft is at least partially non-corrugated.

14. An inspection assembly as set forth in claim 8, wherein the first part of the flexible shaft is connected to the second part of the flexible shaft via a coupling.

15. An inspection assembly as set forth in claim 8, further including at least one non-metallic retrieval cable enclosed within the flexible shaft connected to the probe head for transmitting a pulling force to the probe head upon needed retrieval of the probe head from the elongate hollow member.

* * * * *